United States Patent [19]
Araki et al.

[11] Patent Number: 5,461,787
[45] Date of Patent: Oct. 31, 1995

[54] FILAMENT-TYPE TRIMMING APPARATUS

[75] Inventors: Minoru Araki, Chiba; Shinichi Miyama, Ichihara, both of Japan

[73] Assignee: Tanaka Kogyo Co., Ltd., Chiba, Japan

[21] Appl. No.: 314,329

[22] Filed: Sep. 28, 1994

[30] Foreign Application Priority Data

Apr. 7, 1994 [JP] Japan .................. 6-092854

[51] Int. Cl.$^6$ .................................. A01D 50/00
[52] U.S. Cl. ................................ 30/276; 56/12.7
[58] Field of Search ............ 30/276, 347; 56/12.7, 56/295

[56] References Cited

U.S. PATENT DOCUMENTS

| | | | |
|---|---|---|---|
| 4,169,311 | 10/1979 | Evenson et al. | 30/276 |
| 4,259,782 | 4/1981 | Proulx | 30/276 |
| 4,566,189 | 1/1986 | Muto | 30/276 |
| 5,095,688 | 3/1992 | Fabrizio | 56/12.7 |
| 5,222,301 | 6/1993 | Sugihara et al. | 30/276 |

*Primary Examiner*—Hivei-Siu Payer
*Attorney, Agent, or Firm*—Frishauf, Holtz, Goodman, Langer & Chick

[57] ABSTRACT

A filament-type trimming apparatus comprises a reel case including a main body and a bottom member, a cord reel housed in the reel case and which is wound with a nylon cord, plural stoppers on a lower surface of the cord reel and on an inside of the bottom member and which become engaged when the cord reel is pressed downward by a coil spring, a mechanism for releasing a centrifugal force of the cord reel and which is provided between the cord reel and the bottom member and which comprises radial guide grooves and balls arranged inside the guide grooves, and plural stoppers on an upper surface of the cord reel and on an inner surface of the reel case respectively and which become engaged when the cord reel is pressed upward resisting against the pressing force of the coil spring. A boss is provided inside the reel case main body at its center and to which the coil spring is fixed. Plural positioning projections are provided outside the boss in a direction of rotation at a predetermined intervals, the positioning projections each having a height graduated with respect to one another. A rotatable spacer member is interposed between the positioning projections and the coil spring. A predetermined pressing force of the spring is maintained to enable a smooth trimming operation even when an engine output and reduction ratio differ from one apparatus to another.

2 Claims, 3 Drawing Sheets

FILAMENT-TYPE TRIMMING APPARATUS

BACKGROUND OF THE INVENTION

The present invention relates to a filament-type trimming apparatus comprising a reel case, a cord reel housed in said reel case, and a nylon cord wound about said cord reel, which is so adapted that the reel case is rotated at a high speed as the tip end of the nylon cord is pulled out therefrom to trim weeds and the like.

Trimming apparatuses of this type are known in the art, for example as disclosed in U.S. Pat. No. 4,566,189 (EP NO. 140,634; JP NO. 1,557,694).

When a filament-type trimming apparatus is used for trimming operation, a nylon cord is paid out by the rotation of the reel case and held by the pressure of the coil spring that retains the cord reel, the pressure force being stronger than the centrifugal force acting on the balls provided underneath the cord reel. When the tip end of the nylon cord wears out due to repeated operation, the rotation of the engine is accelerated to increase the centrifugal force acting on the balls to a level greater than the pressing force of the coil spring retaining the cord reel, and the cord reel is rotated for a given angle to pay out the nylon cord anew.

Thus, if the specifications (e.g. engine output, reduction ratio) of a trimming apparatus to which the reel case is attached are different, the centrifugal force acting on the balls due to rotation of the reel case naturally differs, Which in turn means that various inconveniences in handling would occur, such as that the nylon cord would be paid out in an unnecessary amount to hamper with the trimming operation, or that the nylon cord would not be paid out even if the engine rotation is considerably increased.

In order to avoid such-inconveniences, various proposals have been made in the prior art. For example, plural coil springs with different spring forces are prepared in advance, so that a spring coil with the force matching the centrifugal force acting on the balls of a particular trimming apparatus to be used can be selected. Alternatively, spacers may be suitably interposed between the reel case and the coil spring to adjust the pressing force of the latter.

However, provision of plural coil springs to accommodate to trimming apparatuses with different specifications is disadvantageous in that it entails additional maintenance and management of a large number of coil springs in stock. Use of spacers is also disadvantageous in that it involves troublesome operations in adjusting the pressing force such as removing/attaching the coil spring each time the number of spacers to be interposed is modified.

Conventional trimming apparatuses are typically provided with a blade holder to allow use of a steel blade instead of nylon cord as a means of trimming. A reel case is attached to such a trimming apparatus using bolts and nuts which correspond to their counterparts used to attach a blade holder to the apparatus. This requires stock of bolts and nuts of high size precision to match the screw diameter, pitch, etc. of the apparatus itself. When reel cases of this type are to be sold at do-it-yourself shops generally as a replacement part, it becomes necessary to keep in stock sets of several types of bolts and nuts to accommodate to different types of trimming apparatus on the market, requiring extra cost and maintenance of the stock.

Because of the need to adjust the pressing force of coil spring to suit the particular specifications of a trimming apparatus and the need for special attachment structure, it has been difficult to expand the market for such reel cases that are used in filament-type trimming apparatuses.

BRIEF SUMMARY OF THE INVENTION

Thus, the present invention aims at providing a filament-type trimming apparatus comprising a reel case which includes a main body and a bottom member, a cord reel which is wound with a nylon cord and housed inside said reel case, plural stoppers which are provided on the lower surface of the cord reel and on the inside of the bottom member respectively and which become engaged when said cord reel is pressed downward by a coil spring, a mechanism for releasing the centrifugal force of the cord reel which is provided in between said cord reel and the bottom member of the reel case and which comprises radial guide grooves and balls arranged inside said guide grooves, and plural stoppers which are provided on the upper surface of the cord reel and the inner surface of the reel case main body and which become engaged when the cord reel is pressed upward resisting against the pressing force of the coil spring. The present invention is characterized in that a boss is provided inside said reel case at its center to which is mounted the coil spring, that plural positioning projections are provided outside the boss in the direction of the rotation at a predetermined interval, the positioning projections each having a height graduated with respect to one another, and that a spacer member which is rotatable with respect to the positioning projections is interposed in between the positioning projections and the coil spring, whereby the spring force of the coil can be easily adjusted to match the centrifugal force acting on the balls depending on the specifications of a particular trimming apparatus such as engine output and reduction ratio.

A positioning recess is provided on the upper surface of the reel case itself to receive a portion of the blade holder provided on the trimming apparatus. By providing a concealed type washer underneath the reel case main body, the reel case can be easily attached to the main body of the trimming apparatus using conventional fixing means (nuts or bolts) that are to be inserted via said washer and secured to the bolts or nuts attached to the blade holder of the apparatus. This simple attachment structure enables the present invention reel case to be used in a wide range of applications.

In the filament-type trimming apparatus according to the present invention, the reel case is attached to the main body of the trimming apparatus by fitting the blade holder of the trimming apparatus to the recess provided on the reel case and by screwing the conventional fixing means via the washer. In case the specifications such as engine output and reduction ratio of the trimming apparatus are different, the spacer means is arbitrarily turned so that it can be attached to the positioning projections of a given height. By doing so, the pressing force of the coil spring and the centrifugal force acting on the balls generated by the rotation of the reel case can be adequately adjusted.

DETAILED DESCRIPTION OF THE PREFERRED EMBODIMENTS

The filament-type trimming apparatus according to the present invention will now be described in more detail referring to a preferred embodiment in conjunction with the attached drawings.

Figure 1:
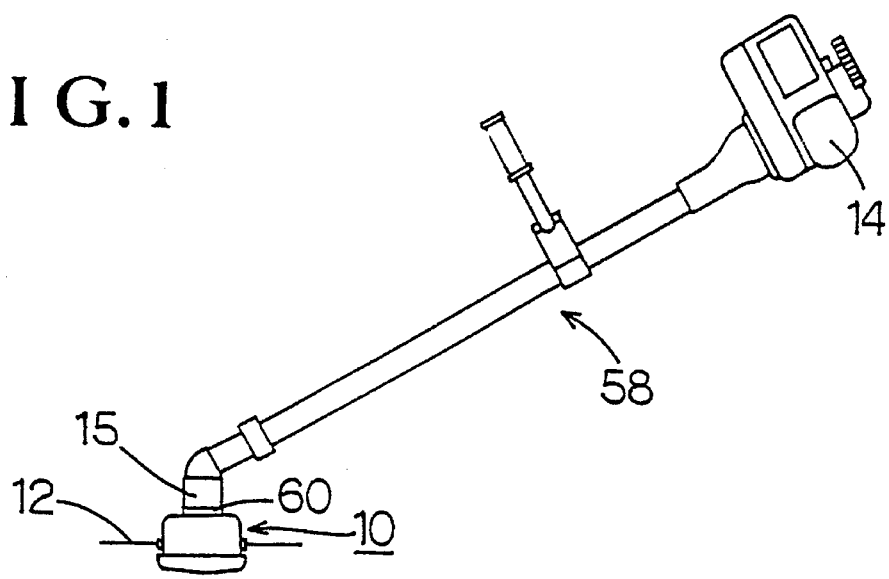
FIG. 1 is an explanatory side view to show the-present invention filament-type trimming apparatus as a whole.

According to the present invention, a cord reel wound with a nylon cord 12 is housed inside a reel case 10. The tip end of the nylon cord 12 is pulled outside the case 10 as the rotational force of an engine 14 is transmitted to the reel case 10 via a gear mechanism, and the tip end of the nylon cord 12 trims weeds and the like (see FIG. 1).

The reel case 10 comprises a reel case main body 18 bored with outlets 16 at predetermined opposing positions on its peripheral side wall for pulling out the nylon cord 12 therefrom, and a bottom member 22 which is fitted in the engagement holes 17, 17 provided on the main body 18 by means of catches 20, 20.

In the space inside the reel case defined by the main body 18 and the bottom member 22 is housed the cord reel 24 wound with the nylon cord 12 as the trimming means. Said cord reel 24 is disposed between a boss 26 provided on the inner surface of the main body 18 and a boss 28 provided on the inner surface of the bottom member 22 and is rotatable with respect to the main body 18 or the bottom member 22 at a predetermined height.

A mechanism 38 for releasing the engagement of the cord reel is provided inside the boss 28 of the bottom member 22, the mechanism comprising a guide member 34 having three guide grooves 32, 32, 32 radially arranged with respect to the shaft 30, and balls 36 arranged inside said guide grooves 32 and on which acts a predetermined centrifugal force generated by the rotation of the reel case 10. The engagement releasing mechanism 38 and the cord reel 24 are constantly pressed downward by a coil spring 42 fitted to a boss 40 which in turn is provided on the inner surface of the reel case main body 18 at its center.

Figure 2:
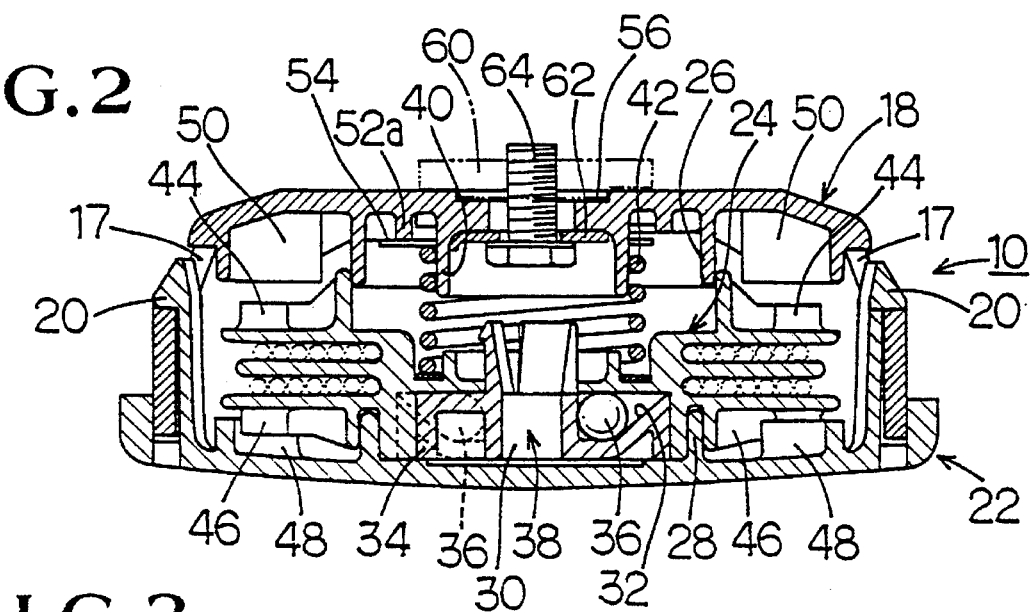
FIG. 2 is an explanatory sectional view to show the structure of the reel case in the filament-type trimming apparatus shown in FIG. 1, with the cord reel being pressed downward by the force of the coil spring.

Stoppers 44 and 46 are provided on the upper and the lower surfaces of the cord reel 24 at an equal interval at corresponding positions along the direction of its rotation. The stoppers 46 become engaged with similar stoppers 48 provided on the inner surface of the bottom member 22 while the cord reel 24 is pressed downward by the coil spring 42, to thereby prevent rotation of the cord reel 24 (see FIG. 2).

Figure 3:
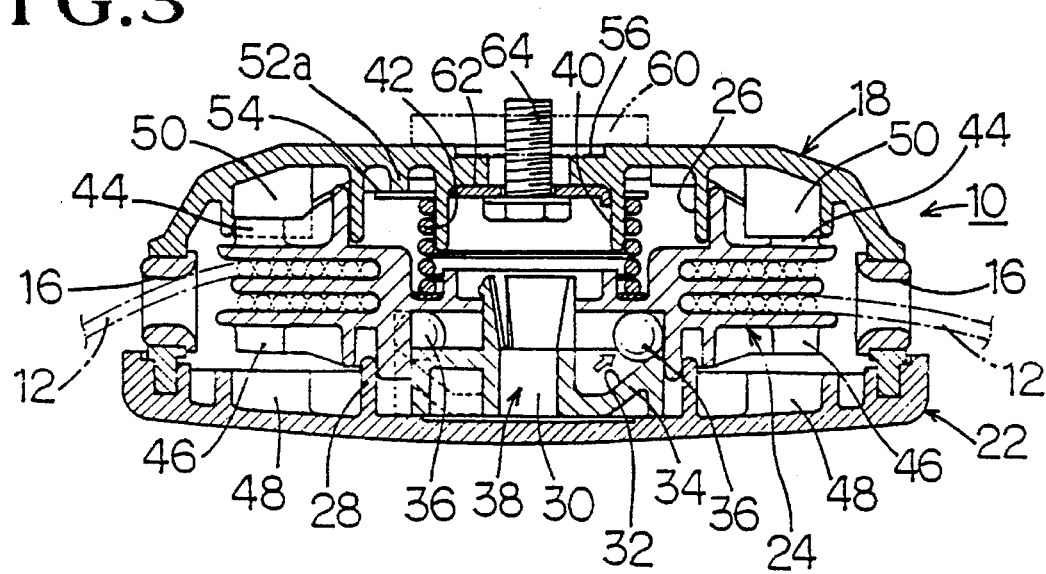
FIG. 3 is an explanatory sectional view to show the cord reel shown in FIG. 2 when it is pushed upward resisting against the pressing force of the coil spring and the paying out of the nylon cord is thus inhibited.
Figure 4:
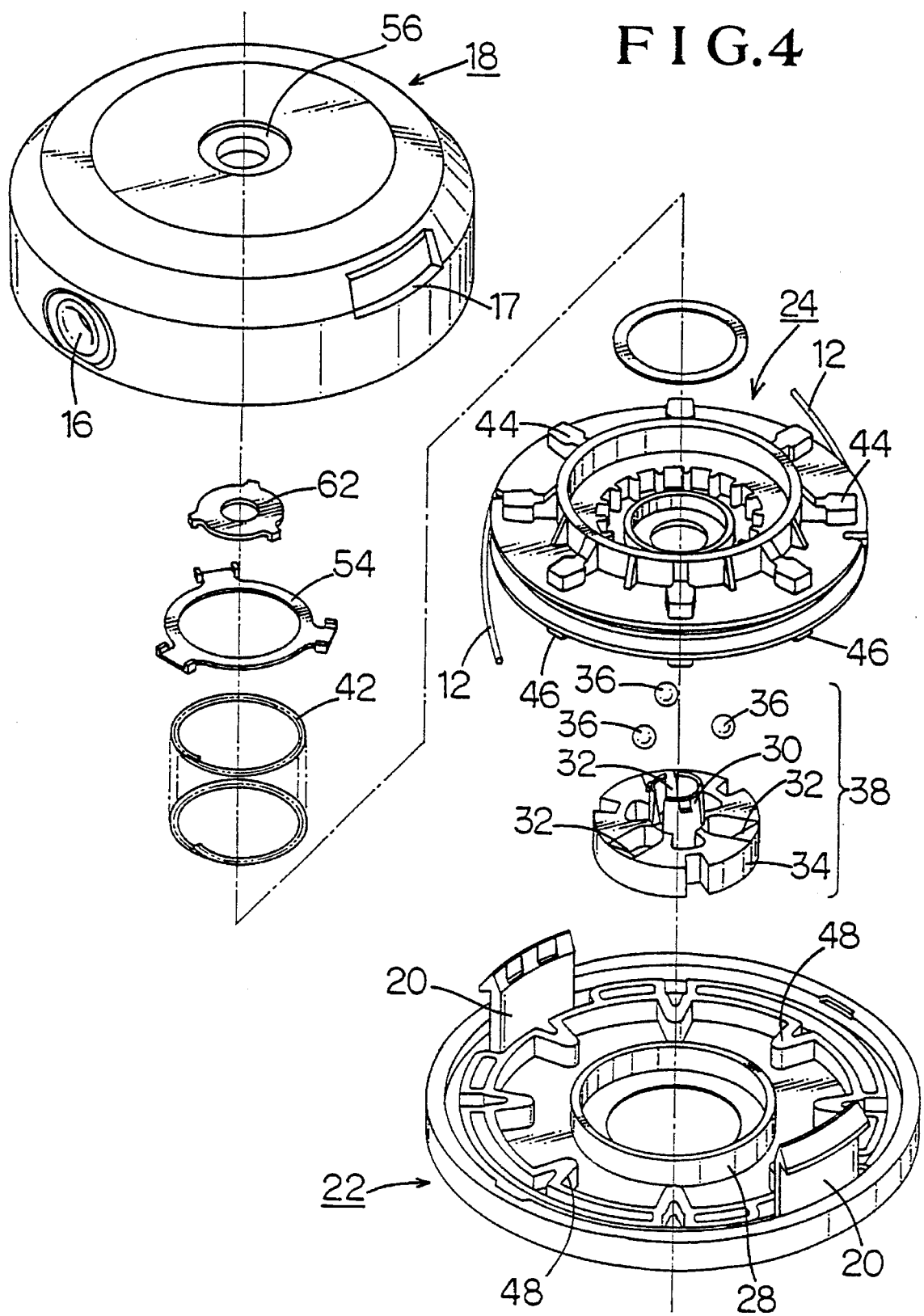
FIG. 4 is an exploded perspective view of the reel case shown in FIG. 2.

Referring to FIG. 3, the centrifugal force acting on the balls 36 increases as the reel case 10 rotates at a higher speed, and the cord reel 24 is pushed upward resisting against the pressing force of the coil spring 42, whereupon said stoppers 44 and the corresponding stoppers 50 provided on the inner surface of the reel case main body 18 become engaged and prevent rotation of the cord reel 24.

Figure 5:
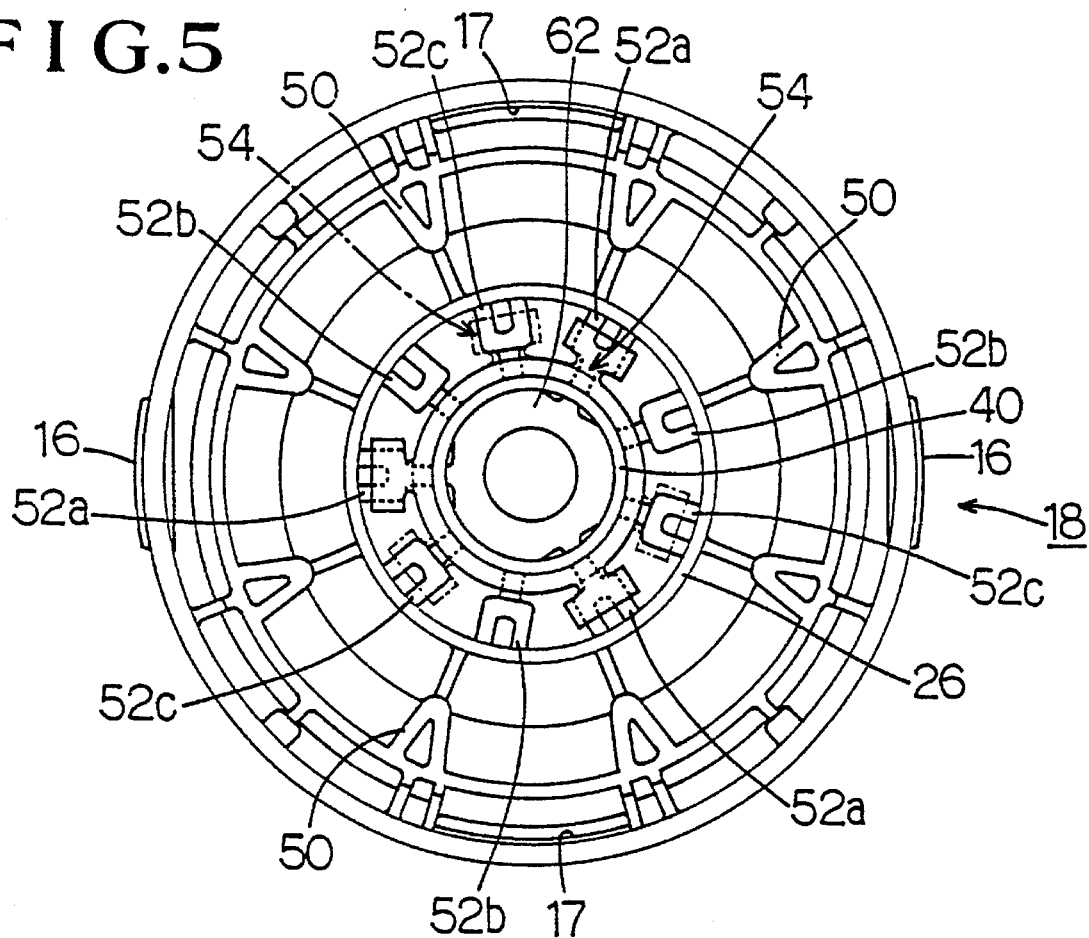
FIG. 5 is a bottom view to show the reel case main body with the disk-shaped spacer means attached to the positioning projections.

Positioning projections 52 (52a through 52c) are arranged in between the bosses 26 and 40 of the main body 18 at a predetermined interval along the direction of rotation. The positioning projections 52 have graduated heights with respect to one another. Further, a disk spacer with lips 54 having a predetermined thickness is interposed between the positioning projections 52 and the coil spring 42 pressing down the cord reel 24. The disk spacer 54 is fitted, for example, on the positioning projections 52a as shown in FIG. 5, so that the centrifugal force acting on the balls and the pressing force of the coil spring 42 can be adjusted to match the engine output or the reduction ratio of the trimming apparatus 58 to which the reel case is to be attached.

A recess 56 is provided on the upper surface of the reel case 10 at its center for positioning a blade holder 60 attached to the trimming apparatus 58. A concealed washer 62 is disposed on the lower surface of the reel case 10 at its center, so that the reel case 18 is attached to the trimming apparatus 58 by screwing a bolt 64 into the apparatus 58 from underneath the reel case 18 via the concealed washer 62 after the blade holder 60 of the apparatus 58 is fitted and positioned in the recess 56.

In the filament-type trimming apparatus of the above construction, the reel case 10 is rotated by the dynamic force of the engine 14 transmitted via the gear mechanism 15. When the reel case 10 is rotating at a relatively low speed but high enough for trimming operation by the nylon cord 12, the engagement releasing mechanism 38 does not operate as the centrifugal force acting on the balls 36 is small, and the cord reel 24 can rotate integrally with the reel case 10. As the cord reel 24 is under the downward pressing force of the coil spring 42, the stopper 46 and the stopper 48 arranged on the inside of the bottom member 22 become engaged, causing the nylon cord 12 to rotate with the reel case 10 with its tip end being paid out for a given length (see FIG. 2).

As the trimming operation is thus in process, the tip end of the nylon cord 12 may become shortened due to wear. If necessary, the nylon cord 12 can be paid out by increasing the rotational speed of the reel case 10 to a level higher than at the initial trimming operation. That is, as the rotational speed of the cord reel 24 rotating interlockingly with the reel case 10 is increased, the centrifugal force acting on the balls 36 increases to cause each of the balls 36 to move outwardly along the guide groove 32 to a portion where the groove is shallower. As a result, the cord reel 24 is pushed upward resisting against the pressing force of the coil spring 42 to eventually release the engagement between the stopper 46 and the stopper 48 provided on the inside of the bottom member 22. The cord reel 24 itself is thereupon released from the impact of the rotational force transmitted from the bottom member 22 to become freely and independently rotatable.

Under this state, the tip end, although worn, of the nylon cord 12 wound about the cord reel 24 is still protruding from the outlet 16 of the reel case 10. Because of the centrifugal force acting on the tip end of the thus protruding tip end of the nylon cord 12, the nylon cord 12 rotates at a speed higher than the reel case 10 itself and in the direction which causes the nylon cord to be paid out.

When the centrifugal force that causes the nylon cord 12 to be paid out also causes the cord reel 24 to somewhat move upward, the stopper 44 of the cord reel and the stopper 50 arranged inside the reel case main body 18 become engaged to cause the cord reel 24 to rotate synchronously with the reel case 10. This prevents the nylon cord 12 from being further paid out (see FIG. 3).

As has been mentioned in the foregoing, paying out of the nylon cord 12 which is the trimming means can be controlled as the cord reel 24 is maintained at a predetermined position by utilizing the relation between the pressing force of the coil spring 42 acting on the cord reel 24 and the centrifugal force acting on the balls 36 of the engagement releasing mechanism 38 provided underneath the cord reel 24.

To attach the reel case 10 to another trimming apparatus, the bottom member 22 is detached from the main body 18 by pressing the catches 20 of the bottom member 22 inward and the main body 18 is detached from the trimming apparatus 58 by unscrewing the fixing bolt 64. Then, a projected portion of the blade holder 60 of a new apparatus 58 is fitted and positioned in the recess 56 of the reel case 18, and the reel case 10 and the new apparatus 58 are assembled by screwing the fixing bolt 64 of the latter via the concealed washer 62.

Figure 6:
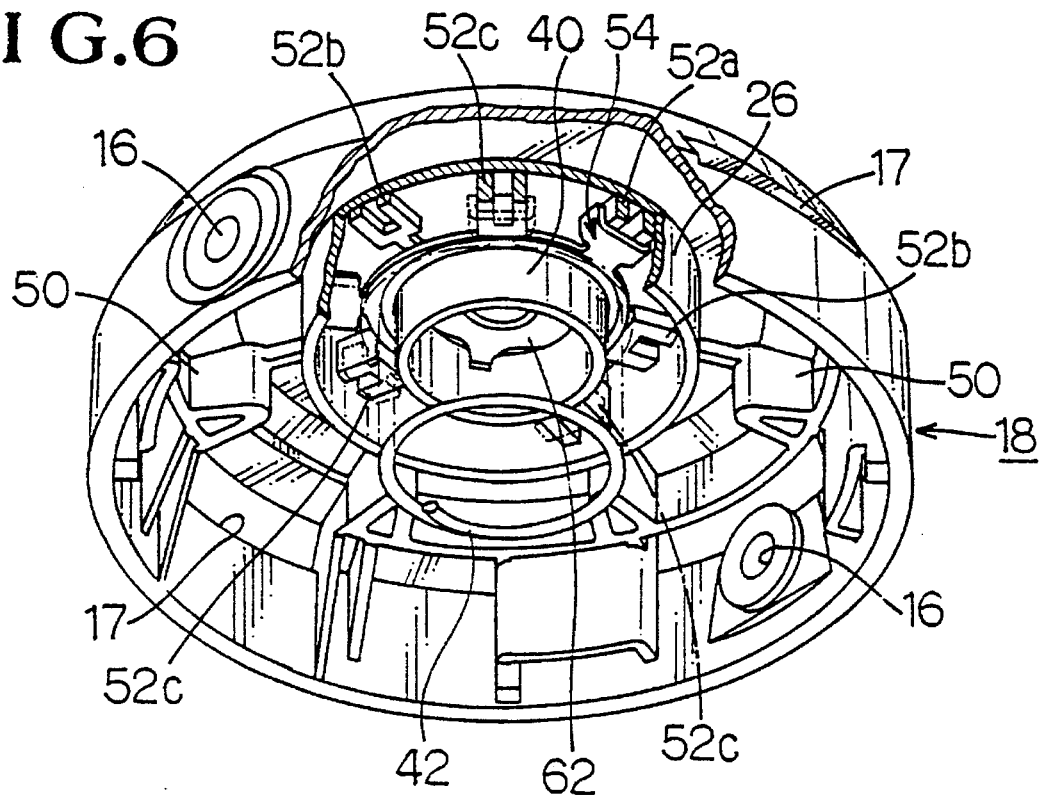
FIG. 6 is a partially cutaway perspective view to show the reel case shown in FIG. 5.

In case the specifications of the new apparatus such as the engine output and the reduction ratio are different from the former apparatus, the disk spacer 54 fitted on the positioning projections 52a is arbitrarily turned and shifted to a new position, as shown by the dot and chain in FIGS. 5 and 6, to be fitted, for example, to another set of positioning projections 52c, to adjust the height to match the specifications of the new apparatus and to adequately adjust the pressing force of the coil spring 42 acting on the cord reel 24. Finally, the bottom member 22 may be attached to the reel case main body 18 by means of the catches 20.

As has been described in the foregoing, the filament-type trimming apparatus according to the present invention can be easily adjusted of its pressing force of the coil spring to match the specifications of any trimming apparatus by arbitrarily turning and fitting the spacer member to be be fitted on positioning projections of a predetermined height. This eliminates the need to keep in stock several kinds of coil springs to accommodate different specifications of trimming apparatuses, facilitating maintenance and management. The pressing force of the coil spring can be adjusted over a wider range by suitable combination of different heights of the positioning projections and different thicknesses of the spacer. Handling in general including paying out of the nylon cord of the trimming apparatus is also facilitated.

Because the conventional fixing means initially attached to a trimming apparatus can be utilized to assemble the trimming apparatus and the reel case, it is not necessary to keep in stock bolts and nuts of special and precise configuration to correspond to the screw diameter and pitch, etc. of the trimming apparatus. Because the number of parts is few, the present invention reel case is cost- and time-saving when sold at do-it-yourself shops as replacement parts in general.

Although the filament-type trimming apparatus according to the present invention has been described in detail in terms of a preferred embodiment, the present invention is in no way limited by the embodiment and various modifications and variations in the design are possible without departing from the scope and spirit of the present invention.

What is claimed is:

1. A filament-type trimming apparatus comprising:

a reel case which includes a main body and a bottom member;

a cord reel housed inside said reel case and on which a nylon cord is wound;

plural stoppers provided on a lower surface of the cord reel and on an inside of the bottom member and which become engaged when the cord reel is pressed downward by a coil spring;

a mechanism for releasing a centrifugal force of the cord reel, and which is provided between the cord reel and the bottom member, and which mechanism comprises radial guide grooves and balls arranged inside said guide grooves;

plural stoppers provided on an upper surface of the cord reel and on an inner surface of the reel case main body respectively and which become engaged when the cord reel is pressed upward resisting against the pressing force of the coil spring;

a boss provided inside a center portion of said reel case main body and to which the coil spring is fixed;

plural positioning projections provided outside said boss in a direction of rotation at predetermined intervals, the positioning projections each having a height graduated with respect to one another; and a spacer member, which is rotatable with respect to the positioning projections, interposed between the positioning projections and the coil spring.

2. The filament-type trimming apparatus as claimed in claim 1, wherein:

a positioning recess is provided on an upper surface of the reel case main body; and the apparatus further comprises:

a blade holder attached to the trimming apparatus, a portion of the blade holder being received in said positioning recess; and a concealed washer disposed underneath the reel case main body, said concealed washer being received in said positioning recess.

* * * * *